United States Patent [19]

Todt

[11] Patent Number: 5,623,812
[45] Date of Patent: Apr. 29, 1997

[54] SHRINK WRAP MATERIAL AND METHOD FOR PROTECTING ARTICLES

[75] Inventor: Gregory L. Todt, Union, Mich.

[73] Assignee: Transhield Technology Co., LLC, Elkhart, Ind.

[21] Appl. No.: 552,883

[22] Filed: Nov. 3, 1995

Related U.S. Application Data

[62] Division of Ser. No. 324,105, Oct. 14, 1994, Pat. No. 5,491,017.
[51] Int. Cl.$^6$ ............................ B65B 23/00; B65B 53/02
[52] U.S. Cl. ........................... 53/442; 53/472; 53/139.5
[58] Field of Search ............................ 53/472, 442, 428, 53/111 R, 111 RC, 139.5, 557

[56] References Cited

U.S. PATENT DOCUMENTS

| | | | |
|---|---|---|---|
| 3,017,729 | 1/1962 | Cheeley | 53/442 X |
| 3,653,497 | 4/1972 | Hornstein | 53/442 X |
| 3,694,995 | 10/1972 | McKinney | 53/442 |
| 3,809,223 | 5/1974 | Kendall | 53/442 X |
| 4,763,783 | 8/1988 | Talbot | 53/461 X |
| 5,149,578 | 9/1992 | Wheatley et al. | 53/442 X |

FOREIGN PATENT DOCUMENTS

| | | |
|---|---|---|
| 84778 | 9/1981 | Japan . |
| 192941 | 10/1990 | Japan . |
| 215924 | 12/1992 | Japan . |

*Primary Examiner*—Linda Johnson
*Attorney, Agent, or Firm*—Baker & Daniels

[57] ABSTRACT

A method and material for shrink wrapping articles includes wrapping the article with a shrink wrapping material having a shrink/stretch film outer layer and an inner layer of a non-woven fabric. The shrink/stretch film responds to heat by shrinking around the article being wrapped, while the non-woven material aerates to form bubbles thus acting as a cushion between the shrink/stretch film outer layer and the article being wrapped. Accordingly, the article being wrapped is protected during the shrinking process, and is also protected from hurled objects while the article is being transported. The nonwoven layer may be treated with chemical additives to control the environment in which the article is wrapped and/or to indicate tampering.

9 Claims, 3 Drawing Sheets

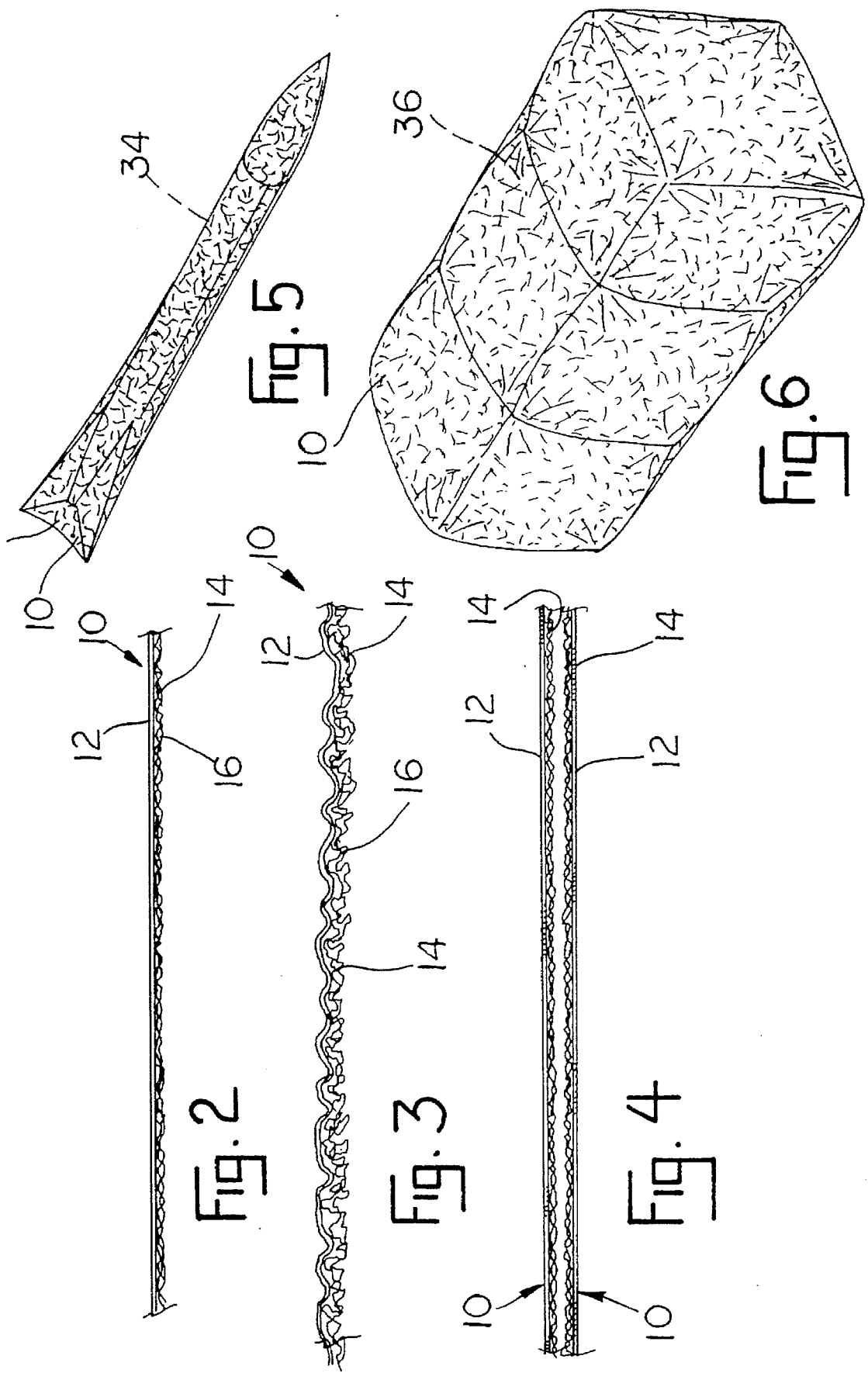

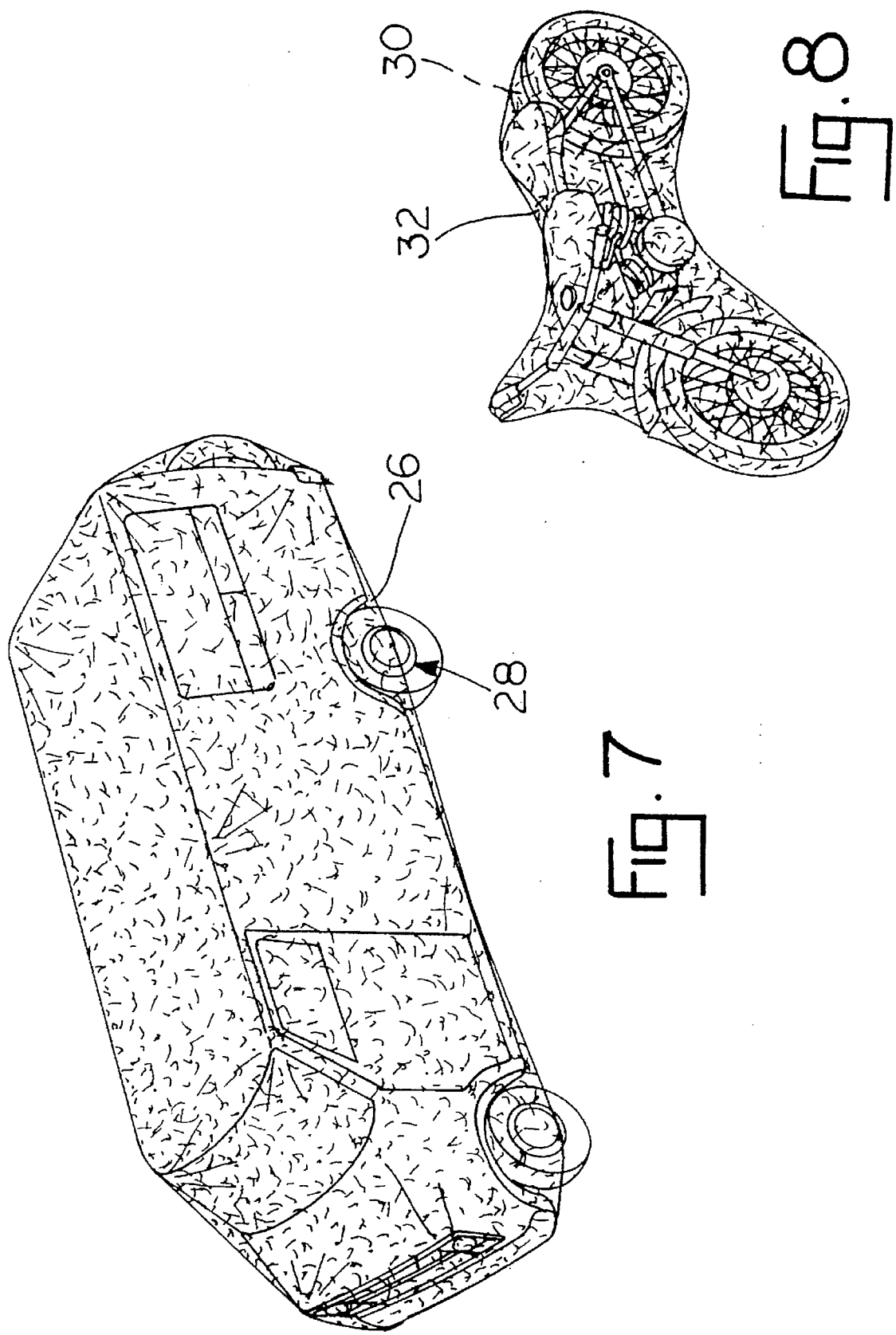

SHRINK WRAP MATERIAL AND METHOD FOR PROTECTING ARTICLES

This is a division of application of Ser. No. 08/324,105, filed Oct. 14, 1994, and now U.S. Pat. No. 5,491,017.

This invention relates to a shrink wrap material and a method for protecting articles by wrapping them in the shrink wrap material.

Large articles, such as automobiles, vans, machinery and boats often must be transported from the factory to the customer on open trucks where they are exposed to the elements. Customers expect that new vehicles, machinery, and other large articles to be in pristine condition when they are delivered, and will not tolerate flaws, even if such flaws are no fault of the manufacturer and have occurred after the article has been shipped from the factory. Damage may be caused by any number of factors. For example, acid rain is an increasingly common phenomena, and, if the acid rain is of sufficient concentration, damaged paint may occur. Furthermore, open transport of such articles subjects the articles to damage due to small rocks and stones which may be hurled against the article during transportation. One way to protect even large articles from the environment is through shrink wrapping, which is most commonly employed on very small household articles. A method of shrink wrapping automotive vehicles is disclosed in U.S. Pat. No. 3,653,497.

However, it is difficult to shrink wrap large articles, such as vehicles, machinery or boats. When the shrink wrap film is heated during shrinking, it becomes very vulnerable. Accordingly, holes are often pulled in the shrink wrap film as the latter is applied over the vehicle or other large object. Furthermore, the shrink wrap film itself is abrasive and can damage paint when the shrink wrap film is applied to an article.

According to the present invention, a two layer shrink wrap material includes a shrink/stretch film as the outer layer, and an inner layer composed of a non-woven fabric consisting of randomly arranged, non-woven fibers which cooperate to define voids. Accordingly, the inner layer is a soft fabric, which acts as a cushion that supports the shrink/stretch film away from the paint. When the shrink/stretch film is shrunk around the article, the non-woven layer aerates to form bubbles, thus further softening the non-woven fabric. The aeration is due to the differential shrink response between the shrink wrap and the non-woven fabric, and is also a result of heating the shrink film to cause shrinkage, which also causes the air entrained within the non-woven fabric to expand, thus causing formation of bubbles to further soften the material. Because of the cushioning effect of the non-woven fabric, the stretch of the shrink film is limited to a comparatively small area, thus substantially reducing the chance that the shrink film will rupture as it is applied. After the material is shrunk around the article, the material retains its elasticity, again due to the cushioning effect of the non-woven inner layer, so that the material resists rupture if it is struck by hurled objects, such as rocks and stones. Accordingly, an important advantage of the present invention is that an improved shrink wrap material protects large objects during the shrink wrapping process itself and also resists environmental contaminants and hurled objects after the material is shrunk around the article.

Still another important advantage of the present invention is that the non-woven layer may be treated with additives, such as acids, acid neutralizers, anti-fogging agents, microbial agents, antioxidants, antistats, UV stabilizers, hydrophilic and/or hydrophobic surfacants, and many other chemicals to thereby control the environment around the article protected by the material of the present invention. Furthermore, tampering can be indicated by applying an air reacting color agent to the non-woven layer. Accordingly, if the outer shrink film is punctured, a color change in the non-woven fabric will immediately indicate tampering. The shrink material according to the present invention may, however, be made to "breathe" if desired by providing perforations in the outer shrink film.

These and other advantages of the present invention will become apparent from the following description with reference to the accompanying drawings, in which:

FIG. 2 is a cross sectional view taken through the shrink wrapping material according to the present invention before the material is shrunk around an article;

FIG. 3 is a cross sectional view similar to FIG. 2 but illustrating the shrink wrapping material according to the present invention after it is shrunk around an article;

FIG. 4 is a cross sectional view illustrative of the manner in which the shrink wrapping material illustrated in FIG. 2 is rolled together with the non-woven fabric sides of the material facing one another, so that the material can be formed into a bag fitting around an article to be protected;

FIG. 5 is a perspective view of a military missile which is wrapped using the shrink wrapping material made according to the present invention;

FIG. 6 is a perspective view of a bale of hay which is wrapped using the material according to the present invention;

FIG. 7 is a perspective view of an automotive vehicle which is to be protected by the shrink wrapping material according to the present invention; the vehicle is illustrated after the material is placed on the vehicle but before shrinking; and FIG. 8 is a perspective view of a motorcycle protected by the shrink wrap material made pursuant to the present invention.

Figure 1:
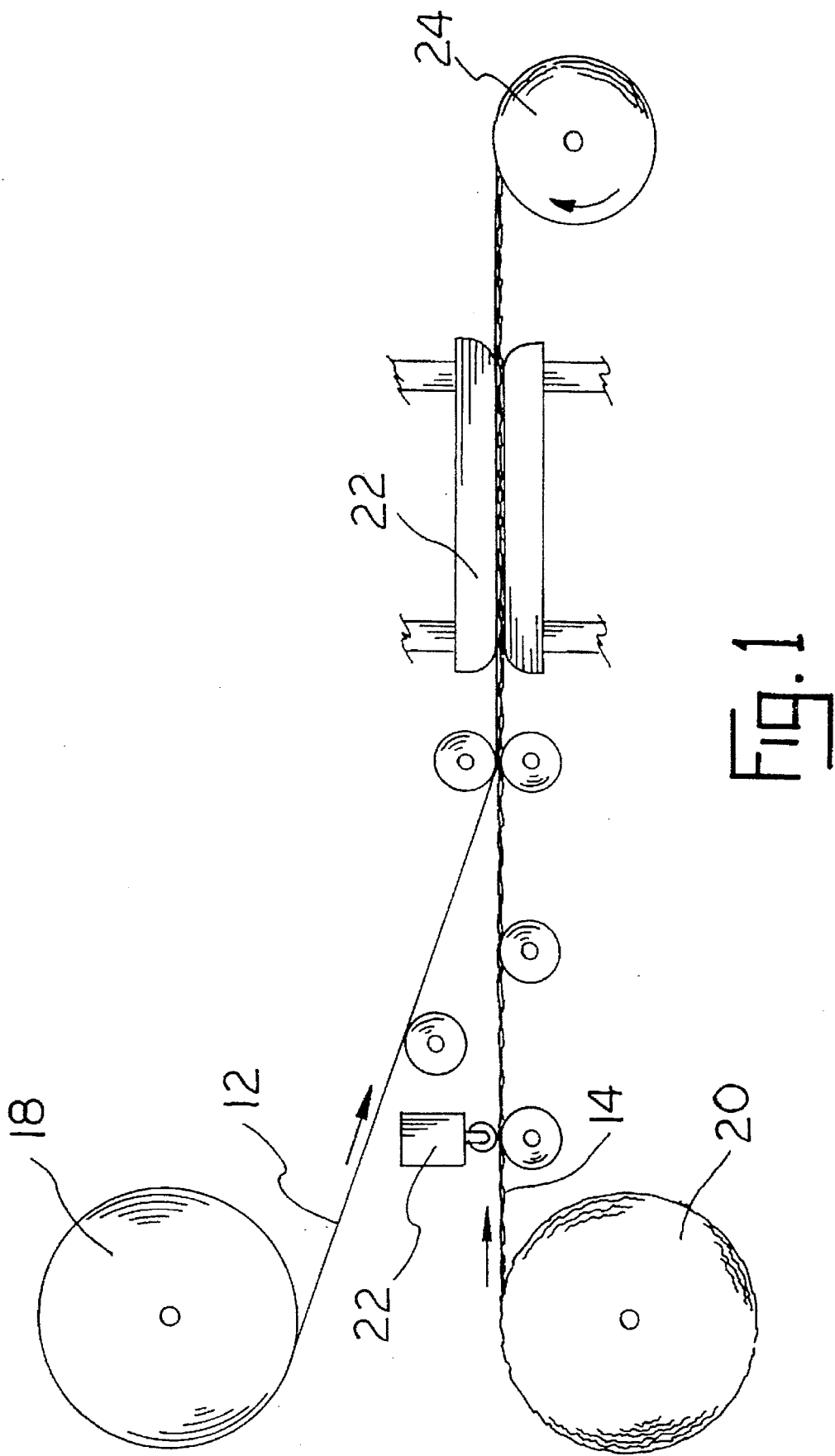
FIG. 1 is schematic illustration of the manner in which the shrink wrapping material according to the present invention is manufactured.

Referring now to FIGS. 2–3 of the drawings, a shrink wrap material generally indicated by the numeral 10 made according to the present invention includes a layer 12 consisting of a shrink/stretch film which has a predetermined shrink response in response to heat applied to the film and a second layer 14 which is secured to the layer 12 as will be hereinafter described. The second layer 14 is a non-woven fabric comprising non-woven, randomly arranged fibers. The first layer 12 may be of any known type of shrink/stretch films well known to those skilled in the art, but is preferably a polyolafin in the ethylene vinyl acetate copolymer family. However, other shrink wrap films may be used. The non-woven fabric 14 may be of any well known type, and may include both natural and man-made fibers, or combinations thereof, such as polyester, nylon 6, 6 or a combination of wood pulp and polyester fibers. Typical fabrics are sold by the Dupont Corporation under the trademark Sontara® or by Fabreweb North America, Inc., identified as fabric PBN-2. The non-woven fabric may be spun bonded. It will be noted that the fibers forming the non-woven fabric 14 cooperate to define voids 16. Accordingly, the upper and lower surfaces of the non-woven fabric 14 are irregular. As will hereinafter be explained, an adhesive is applied to the surface of the fabric 14 that will be bonded to the film 12. Accordingly, the adhesive is applied only to the raised portions of the fabric 14, and does not wet through the bat. Accordingly, the non-woven fabric 14 is not continuously bonded to the film 12, but only the raised portions of the fabric 14 are bonded to the film 12, thus creating discontinuities in the bond, such that only a relatively small percentage of the surface area of the fabric 14 is secured to the shrink film 12. This permits the non-woven fabric 14 to aerate during the shrinking process, thus permitting the non-woven fabric 14 to act as a cushion between the shrink film 12 and the article being wrapped. The aeration of the non-woven fabric 14 is due to the fact that the heat applied to shrink the material 10 around the article being wrapped causes air entrained in the voids 16 to expand, thus substantially increasing the size of the voids. Formation of the larger voids or bubbles is also due to the fact that the fabric 14 has a different shrink response than does the shrink film 12. Although the film 12 shrinks in response to heat applied thereto, the non-woven fabric 14 may either remain about the same size or increase in size to expand the voids in response to the applied heat. Since heat applied to shrink the film 12 may approach 400° F. during the shrinking process, it is important that the material from which the non-woven fabric 14 is manufactured be able to withstand such temperatures.

It is also important that the fibers comprising the non-woven fabric 14 be able to reflect and/or absorb the majority of the heat. Accordingly, the article being wrapped is protected from the heat applied to shrink the material 10. Less heat is required to shrink the material 10, since the fibers of the fabric 14 reflect heat back into the shrink film 12, thus reducing the amount of heat that must be applied to the shrink film 12 in order to effect shrinkage. Since, as will be discussed later herein, it is desirable to apply chemicals to the non-woven fabric 14 to thereby either control the environment of the article being wrapped or to treat the article being wrapped, it is important that the fibers from which the fabric 14 is formed are both highly chemical resistant and inert.

The adhesive applied to the non-woven fabric 14 is preferably a rubber thermoplastic hot melt adhesive in the "block copolymer" family. Any one of several compounds well known to those skilled in the art may be used with equal effectiveness. It is important that the adhesive be of a consistency that does not wet through the fabric 14, yet can be easily applied to the raised portions of the surface of the fabric 14 which is bonded to the shrink film 12. Because the adhesive is a hot melt, it is tacky when applied to the fabric so that a good stick is obtained when the fabric 14 and the film 12 are merely touched together, and no pressure need be applied to obtain bonding. Pressure would compress the non-woven fabric 14, which is obviously undesirable.

Referring now to FIG. 1, the film 12 is fed from a roll 18 and the non-woven fabric 14 is fed from a roll 20. Fabric 14 is fed through a gluing station 22 where the hot melt adhesive is applied lightly to the upper surface of the fabric 14 as it is fed toward the bonding station 22. Bonding station 22 gradually reduces the distance between the fabric 14 and the film 12 as these materials are carried through the bonding station 22. The bonding station 22 is adjusted such that the film 12 is brought into touching engagement with the fabric 14 without substantial pressure being applied to either the film 12 or the fabric 14. As described above, since the adhesive using a hot melt adhesive and is very tacky, this touching of the film 12 against the non-woven fabric 14 is all that is required to secure the film to the fabric, it being noted that the bonding will only take place across a relatively small percentage of the fabric 14 and film 12, since the adhesive is applied only to the raised portions of the fabric 14 and does not wet through the fabric 14. After passing through the station 22, the material is wound on a roll 24.

Referring to FIG. 4, the shrink wrapping material 10 from two rolls 24 are unwound from the rolls 24 and then rewound on another roll, with the non-woven fabric 14 of the layers wound facing one another as indicated in FIG. 4. Accordingly, a section comprising two layers of the material 10, with the fabric layers 14 facing one another, may be unwound from the roll, an appropriate amount cut off, and the edges are sealed to form a bag in which the non-woven fabric 14 is on the inside of the bag and the shrink film 12 is on the outside of the bag. As illustrated in FIG. 7, the bag 26 of the material thus formed is placed over an automotive vehicle 28 which is to be wrapped by the material 10. Heat is then applied to the bag 26 to shrink the bag around the vehicle 28. Heat may be applied either through a conventional heating tunnel, in the case of high volume production, or by the use of hand held blowers, in which one or more workmen with a blower walk around the van 28 to apply heat to the bag 26, thereby causing the latter to shrink into contact with the van 28.

As discussed above, as the bag is heated, the non-woven layer 14, which forms the inside of the bag 26, aerates to form bubbles, thus expanding the non-woven fabric 14 so that it softens and acts as a cushion, maintaining the film 12 away from the article being wrapped. Since the fabric 14 is extremely soft, it will not damage paint, and the cushioning provided by the fabric causes the material 10 to resist puncture by hurled objects such as stones or rocks during transport of the vehicle 28 to the consumer. Furthermore, during the shrinking process, the film 12 is extremely vulnerable to rupture, since the heat applied during shrinkage weakens the film. Accordingly, it is difficult to apply prior art materials to large objects since the stretching force applied to the film may be transmitted over a large area and may rupture the film. However, the cushioning provided by the non-woven fabric 14 of material 10 limits application of the stretching forces during shrinkage to a relatively small area, thus reducing the chance that the shrink film 12 will rupture.

Referring now to FIG. 8, other articles, such as a motorcycle 30, may also be wrapped using the material and method of the present invention. When motorcycle 30 is wrapped, the bag 32 is cut to size to fit over the motorcycle 30, and then shrunk into engagement with the motorcycle 30, thus providing protection for the motorcycle 30 during transport. As described above, any other article which is subject to damage during transport, particularly large articles, may be wrapped using the material and process of the present invention. In addition to automotive vehicles and motorcycles, lawn and garden equipment, boats and large machinery may also be wrapped.

Referring to FIG. 5, a military product, such as a missile 34, is illustrated wrapped by the material 10. Obviously, the performance of military products, such as the missile 34, may be affected if damage to the paint occurs, since even small defects in the paint may cause the flight path of the missile 34 to be changed. Furthermore, it is important to safeguard military products from tampering and sabotage, and to be able to know if such tampering or sabotage has occurred. Accordingly, the non-woven fabric 14 of the shrink wrap material 10 used to wrap the military product 34 is treated with a known air activated color change material. Accordingly, if the film 12 is punctured, the color change material will be activated, thereby immediately notifying of a punctured outer layer, so that tampering of the military missile 34 will be indicated. Other chemical additives may be used to treat the fabric 14, such as chemicals to control the humidity within the envelope formed by the material 10, UV stabilizers to prevent sunlight damage to products wrapped by the material, and acid or acid neutralizers, to control the acidity of the environment.

Referring to FIG. 6, an agricultural product, such as a bale of hay 36, may also be wrapped by the material 10. Most agriculture products, such as hay, degrade quickly, generally must be used near where the product is produced, and generally cannot be exported. Accordingly, by wrapping the bale of hay 36 with the material 10, the environment can be controlled to maintain freshness of the product. For example, anti-fungal agents may be added to the material 14 and other additives may be added to control the humidity to which the product 36 is maintained. Of course, the outer layer 12 can be made air permeable by punching holes in the material, if such is desired.

Accordingly, the shrink wrapping material 10 may be used to wrap a large variety of both large and small articles. The shrink wrap material 10 not only protects the article being wrapped from the abrasive effect of the outer film 12 as the article is being wrapped, but also protects the article from environmental conditions, such as rain, mud or hurled objects. Both large and small articles may be wrapped with the material and then transported without damage to the article. Furthermore, the inner layer may be treated to control the environment in which the wrapped article is maintained, and also may be treated with material that will indicate tampering.

I claim:

1. Method of protecting articles against surface damage comprising the steps of providing a wrap material consisting of a shrinkable, stretchable film first layer engaging and intermittently secured to a second layer of fibers arranged into a non-woven fabric, arranging said wrap material around said article such that the wrap material covers the article with the second layer against the article and the first layer away from the article, and applying heat to said wrap material sufficient to shrink said first layer to an extent that the second layer engages said article and prevents contact by said first layer with said article.

2. Method of protecting articles as claimed in claim 1, wherein said method includes the step of applying sufficient heat to said wrap material to cause said second layer to aerate to form bubbles in said second layer.

3. Method of protecting articles as claimed in claim 1, wherein said non-woven fabric includes an irregular surface defined by said fibers having raised and lowered portions, and said method includes the step of securing said irregular surface to said first layer by applying adhesive to said raised portions.

4. Method of protecting articles as claimed in claim 1, wherein said method includes the step of adding chemical treatment material to said non-woven fabric to control the environment in which the article is stored.

5. Method of protecting articles as claimed in claim 1, wherein said method includes the step of applying an air activated color change chemical to said non-woven fabric whereby puncture of said first layer is indicated by color change of said second layer.

6. Method of protecting articles against surface damage comprising the steps of providing a wrap material consisting of a shrinkable, stretchable film first layer intermittently bonded to a second layer of fibers defining voids therebetween, said fibers being arranged into a non-woven fabric, arranging said wrap material around said article such that the wrap material covers the article with the second layer against the article and the first layer away from the article, and applying heat to said wrap material sufficient to shrink said first layer to an extent that the second layer engages said article, said applied heat being sufficient to expand air entrained in said voids to soften the fabric to provide a cushion supporting said first layer away from said article.

7. Method of protecting articles as claimed in claim 6, wherein said non-woven fabric includes an irregular surface defined by said fibers having raised and lowered portions, and said method includes the step of bonding said irregular surface to said first layer by applying adhesive to said raised portions.

8. Method of protecting articles as claimed in claim 6, wherein said method includes the step of adding chemical treatment material to said non-woven fabric to control the environment in which the article is stored.

9. Method of protecting articles as claimed in claim 6, wherein said method includes the step of applying an air activated color change chemical to said non-woven fabric whereby puncture of said first layer is indicated by color change of said second layer.

* * * * *

US005623812C1

(12) EX PARTE REEXAMINATION CERTIFICATE (4883rd)
United States Patent
Todt

(10) Number: US 5,623,812 C1
(45) Certificate Issued: Dec. 2, 2003

(54) SHRINK WRAP MATERIAL AND METHOD FOR PROTECTING ARTICLES

(75) Inventor: Gregory L. Todt, Union, MI (US)

(73) Assignee: Transhield AS, Oslo (NO)

Reexamination Request:
No. 90/005,587, Dec. 15, 1999

Reexamination Certificate for:
Patent No.: 5,623,812
Issued: Apr. 29, 1997
Appl. No.: 08/552,883
Filed: Nov. 3, 1995

Related U.S. Application Data

(62) Division of application No. 08/324,105, filed on Oct. 14, 1994, now Pat. No. 5,491,017.

(51) Int. Cl.⁷ ............... B65B 23/00; B65B 53/02
(52) U.S. Cl. ............... 53/442; 53/472; 53/139.5
(58) Field of Search ............... 53/472, 442, 428, 53/111 R, 111 RC, 139.5, 557; 150/166; 206/335, 497; 428/198; 156/85, 86

(56) References Cited

U.S. PATENT DOCUMENTS

| | | | | |
|---|---|---|---|---|
| 3,017,729 A | * | 1/1962 | Cheeley | |
| 3,653,497 A | * | 4/1972 | Hornstein | |
| 3,694,995 A | * | 10/1972 | McKinney | |
| 3,809,223 A | * | 5/1974 | Kendall | |
| 4,247,509 A | | 1/1981 | Talbot | |
| 4,725,473 A | | 2/1988 | Van Gompel et al. | |
| 4,748,070 A | * | 5/1988 | Beehler | 428/198 |
| 4,763,783 A | * | 8/1988 | Talbot | |
| 4,821,785 A | | 4/1989 | Rolan | |
| 4,891,249 A | | 1/1990 | McIntyre | |
| 4,938,522 A | * | 7/1990 | Herron et al. | 150/166 X |
| 5,029,933 A | | 7/1991 | Gillem | |
| 5,149,578 A | * | 9/1992 | Wheatley et al. | |
| 5,342,469 A | | 8/1994 | Bodford et al. | |

FOREIGN PATENT DOCUMENTS

| | | | |
|---|---|---|---|
| GB | 1194706 | | 6/1970 |
| JP | 52-27595 | | 7/1977 |
| JP | 56-84778 A | * | 7/1981 |
| JP | 60-198239 A | * | 10/1985 |
| JP | 62-85940 A | * | 4/1987 |
| JP | 2-192941 A | * | 7/1990 |
| JP | 4-215924 A | * | 8/1992 |

* cited by examiner

Primary Examiner—Stephen F. Gerrity

(57) ABSTRACT

A method and material for shrink wrapping articles includes wrapping the article with a shrink wrapping material having a shrink/stretch film outer layer and an inner layer of a non-woven fabric. The shrink/stretch film responds to heat by shrinking around the article being wrapped, while the non-woven material aerates to form bubbles thus acting as a cushion between the shrink/stretch film outer layer and the article being wrapped. Accordingly, the article being wrapped is protected during the shrinking process, and is also protected from hurled objects while the article is being transported. The nonwoven layer may be treated with chemical additives to control the environment in which the article is wrapped and/or to indicate tampering.

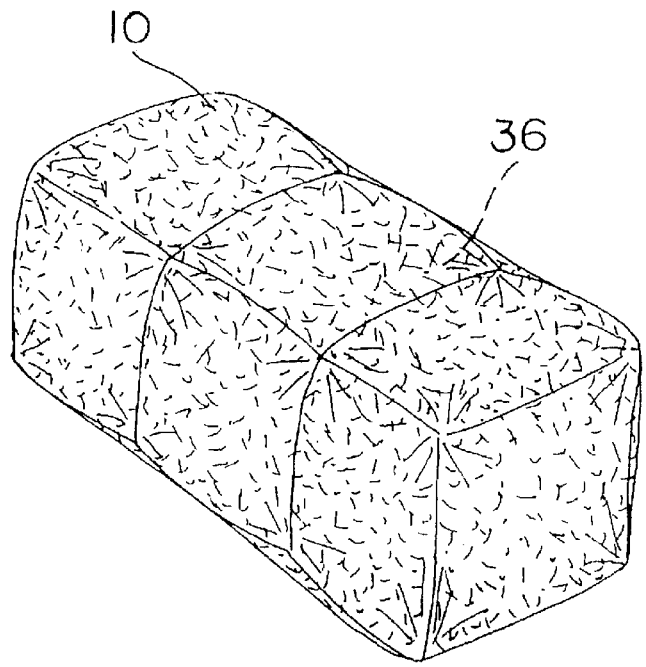

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

New claims 10–13 are added and determined to be patentable.

*10. Method of protecting articles against surface damage comprising the steps of providing a wrap material consisting of a shrinkable, stretchable first layer of film intermittently bonded to a second layer of fibers, defining voids therebetween and arranged into a non-woven fabric, said first layer of film and said second layer of non-woven fabric which is formed from a material other than that of said first layer has a differential shrink response, arranging said wrap material around said article such that the wrap material covers the article with the second layer against the article and the first layer away from the article, applying heat to said wrap material sufficient to shrink said first layer, permitting said second layer and first layer to move relative to each other as said first layer is shrunk as permitted by said differential shrink response to permit said second layer to engage said article and form cushions supporting said first layer away from said article and substantially preventing contact by said first layer with said article.*

*11. Method of protecting articles as claimed in claim 10, wherein said method includes the step of applying sufficient heat to said wrap material to cause said second layer to aerate to form bubbles in said second layer.*

*12. Method of protecting articles as claimed in claim 10, wherein said method includes the step of adding chemical treatment material to said non-woven fabric to control the environment in which the article is stored.*

*13. Method of protecting articles as claimed in claim 10, wherein said method includes the step of applying an air activated color change chemical to said non-woven fabric whereby puncture of said first layer is indicated by color change of said second layer.*

\* \* \* \* \*